United States Patent
Lopes et al.

(10) Patent No.: US 11,234,278 B2
(45) Date of Patent: Jan. 25, 2022

(54) FLEXIBLE RADIO ACCESS NETWORK NODE IDENTIFIER

(71) Applicant: QUALCOMM Incorporated, San Diego, CA (US)

(72) Inventors: Luis Fernando Brisson Lopes, Swindon (GB); Gavin Bernard Horn, La Jolla, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/614,514

(22) PCT Filed: Jun. 19, 2018

(86) PCT No.: PCT/CN2018/091818
§ 371 (c)(1),
(2) Date: Nov. 18, 2019

(87) PCT Pub. No.: WO2018/233600
PCT Pub. Date: Dec. 27, 2018

(65) Prior Publication Data
US 2020/0187275 A1    Jun. 11, 2020

(30) Foreign Application Priority Data
Jun. 19, 2017    (WO) ................ PCT/CN2017/089018

(51) Int. Cl.
*H04W 76/11*    (2018.01)
*H04W 8/08*    (2009.01)
(Continued)

(52) U.S. Cl.
CPC .............. *H04W 76/11* (2018.02); *H04W 8/08* (2013.01); *H04W 24/02* (2013.01); *H04W 36/0061* (2013.01); *H04W 48/16* (2013.01)

(58) Field of Classification Search
CPC ..... H04W 76/11; H04W 36/00; H04W 24/02; H04W 48/16; H04W 8/08;
(Continued)

(56) References Cited

U.S. PATENT DOCUMENTS

2009/0129291 A1* 5/2009 Gupta et al. ................. 370/254
2009/0156214 A1   6/2009 Lee et al.
(Continued)

FOREIGN PATENT DOCUMENTS

| CN | 102843738 A | 12/2012 |
| CN | 105007605 A | 10/2015 |

(Continued)

OTHER PUBLICATIONS

3GPP Study on Flexible eNB-ID and Cell-ID in E-UTRAN, Release 14, 3GPP TR 36.896 V14.0.0 (Sep. 2016) Technical Specification Group Radio Access Network Sep. 30, 2016 (Sep. 30, 2016), pp. 1-18, the whole document.
(Continued)

*Primary Examiner* — Meless N Zewdu

(57) ABSTRACT

Techniques and apparatus for supporting flexible radio access network (RAN) node identifiers in a network are provided. In one technique, a cell identity of a cell associated with a base station in a network is determined. An identifier of the base station is determined from the cell identity based on a partitioning of an identifier space used for identifying cells in the network. A message that includes at least one of the identifier of the base station or the cell identity associated with the base station is transmitted. In another technique, a user equipment may determine whether to take one or more actions while transitioning from operating in an inactive mode to operating in a connected mode based on the identifier of the base station.

24 Claims, 14 Drawing Sheets

(51) Int. Cl.
*H04W 24/02* (2009.01)
*H04W 36/00* (2009.01)
*H04W 48/16* (2009.01)

(58) Field of Classification Search
CPC ............. H04W 36/0061; H04W 36/08; H04W 36/0005; H04W 36/0066; H04W 88/00; H04W 88/02; H04W 88/08; H04W 16/14; H04W 16/16; H04W 16/10; H04W 16/02; H04W 16/00; H04W 84/045; H04W 36/18; H04W 84/10; H04W 36/0077; H04W 36/0011; H04W 36/0016; H04W 28/0808; H04W 76/00; H04W 76/15; H04W 88/18; H04W 92/00; H04W 92/02; H04W 92/04; H04W 92/14; H04W 92/16; H04W 92/20; H04W 48/18; H04W 48/20; H04W 36/0022; H04W 36/0033; H04W 36/00835
See application file for complete search history.

(56) References Cited

U.S. PATENT DOCUMENTS

| | | | |
|---|---|---|---|
| 2010/0008258 A1* | 1/2010 | Ji et al. | 370/254 |
| 2010/0234028 A1* | 9/2010 | Narasimha et al. | 455/437 |
| 2011/0007690 A1* | 1/2011 | Chang et al. | 370/328 |
| 2011/0189987 A1* | 8/2011 | Zhang et al. | 455/422.1 |
| 2013/0196666 A1* | 8/2013 | Zhang et al. | H04W 36/0005 |
| 2014/0274029 A1* | 9/2014 | Radulescu et al. | H04W 24/424 |
| 2015/0031371 A1 | 1/2015 | Zhao et al. | |
| 2015/0140993 A1* | 5/2015 | Horn et al. | H04W 8/26 |
| 2015/0208424 A1 | 7/2015 | Seo et al. | |
| 2016/0050591 A1 | 2/2016 | Israelsson | |
| 2018/0332468 A1* | 11/2018 | Yan et al. | H04W 8/26 |
| 2020/0084678 A1* | 3/2020 | Gunnarsson et al. | H04W 36/0083 |

FOREIGN PATENT DOCUMENTS

| | | |
|---|---|---|
| CN | 106454791 A | 2/2017 |
| WO | WO-2015100735 A1 | 7/2015 |

OTHER PUBLICATIONS

International Search Report and Written Opinion—PCT/CN2018/091818—ISA/EPO—dated Aug. 29, 2018.
International Search Report and Written Opinion—PCT/CN2017/089018—ISA/EPO—dated Feb. 24, 2018.
Qualcomm Incorporated, "On NG-RAN Node Identifiers", R3-172432, 3GPP TSG-RAN WG3 NR#2 AdHoc 20, Jun. 2017 (Jun. 20, 2017), 3 Pages.
Huawei, et al., "Discussion on eNB-ID and Cell-ID extension in E-UTRAN", 3GPP TSG-RAN3 Meeting #93-bis, 3GPP Draft; R3-162321_DISC_ENBID_Extension, 3rd Generation Partnership Project (3GPP), Mobile Competence Centre; 650, Route Des Lucioles; F-06921 Sophia-Antipolis Cedex; France, vol. RAN WG3, No. Sophia Antipolis, France; Oct. 10, 2016-Oct. 14, 2016, Oct. 6, 2016 (Oct. 6, 2016), 4 Pages, XP051151972, Retrieved from the Internet: URL: http://www.3gpp.org/ftp/Meetings_3GPP_SYNC/RAN3/Docs/ [retrieved on Oct. 6, 2016] Paragraph "2 Discussion".
Supplementary European Search Report—EP18819626—Search Authority—Munich—dated Feb. 12, 2021.

\* cited by examiner

| | IE/Group Name | Presence | Range |
|---|---|---|---|
| 1102 | CHOICE *Target ID* | M | |
| 1104 | >*Target RAN Node-ID* | M | |
| 1108 | >>RAN Node ID | M | BIT STRING(SIZE(10..32) |
| 1110 | >>Selected TAI | M | |
| 1106 | >*Cell ID* | M | |
| 1112 | >>Cell ID | M | BIT STRING(SIZE(32)) |
| 1114 | >>Selected TAI | M | |

FIG. 11

FLEXIBLE RADIO ACCESS NETWORK NODE IDENTIFIER

CROSS-REFERENCE TO RELATED APPLICATION

This application is a national stage application under 35 U.S.C. 371 of PCT/CN2018/091818, filed Jun. 19, 2018, which claims priority to PCT Application No. PCT/CN2017/089018, filed Jun. 19, 2017, which are both incorporated by reference herein in their entireties.

BACKGROUND

I. Field of the Disclosure

The present disclosure relates generally to communication systems, and more particularly, to methods and apparatus for supporting variable radio access network (RAN) node identifiers for operations in a network.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for supporting variable and reconfigurable RAN node identifier lengths (e.g., for flexible deployment of cells) in a network.

Certain aspects of the present disclosure provide a method for wireless communication by a first base station. The method generally includes determining a cell identity of a cell associated with a second base station in a network. The method also includes determining, from the cell identity, an identifier of the second base station based on a partitioning of an identifier space used for identifying cells in the network. The method further includes transmitting a message comprising at least one of the identifier of the second base station or the cell identity associated with the second base station.

Certain aspects of the present disclosure provide an apparatus for wireless communication. The apparatus generally includes means for determining a cell identity of a cell associated with a base station in a network. The apparatus also includes means for determining, from the cell identity, an identifier of the base station based on a partitioning of an identifier space used for identifying cells in the network. The apparatus further includes means for transmitting a message comprising at least one of the identifier of the base station or the cell identity associated with the base station.

Certain aspects of the present disclosure provide an apparatus for wireless communication. The apparatus generally includes at least one processor and a memory coupled to the at least one processor. The at least one processor is configured to determine a cell identity of a cell associated with a base station in a network. The at least one processor is also configured to determine, from the cell identity, an identifier of the base station based on a partitioning of an identifier space used for identifying cells in the network. The apparatus further includes a transmitter configured to transmit a message comprising at least one of the identifier of the base station or the cell identity associated with the base station.

Certain aspects of the present disclosure provide a computer-readable medium having computer executable code stored thereon for wireless communication by a first base station. The computer executable code includes code for determining a cell identity of a cell associated with a second base station in a network. The computer executable code also includes code for determining, from the cell identity, an identifier of the second base station based on a partitioning of an identifier space used for identifying cells in the network. The computer executable code further includes code for transmitting a message comprising at least one of the identifier of the second base station or the cell identity associated with the second base station.

Certain aspects of the present disclosure provide a method for wireless communication by a network entity. The method generally includes receiving a message comprising a cell identity of a cell associated with a target base station in a network. The method also includes determining, from the cell identity, an identifier of the target base station based on a partitioning of an identifier space used for identifying cells in the network.

Certain aspects of the present disclosure provide an apparatus for wireless communication. The apparatus generally includes means for receiving a message comprising a cell identity of a cell associated with a target base station in a network. The apparatus also includes means for determining, from the cell identity, an identifier of the target base station based on a partitioning of an identifier space used for identifying cells in the network.

Certain aspects of the present disclosure provide an apparatus for wireless communication. The apparatus generally includes a receiver, at least one processor, and a memory coupled to the at least one processor. The receiver is configured to receive a message comprising a cell identity of a cell associated with a target base station in a network. The at least one processor is configured to determine, from the cell identity, an identifier of the target base station based on a partitioning of an identifier space used for identifying cells in the network.

Certain aspects of the present disclosure provide a computer-readable medium having computer executable code stored thereon for wireless communication by a network entity. The computer executable code includes code for receiving a message comprising a cell identity of a cell associated with a target base station in a network. The computer executable code also includes code for determining, from the cell identity, an identifier of the target base station based on a partitioning of an identifier space used for identifying cells in the network.

Certain aspects of the present disclosure provide a method for wireless communication by a user equipment (UE). The method generally includes determining a cell identity of a cell associated with a base station in a network. The method also includes determining, from the cell identity, an identifier of the base station based on a partitioning of an identifier space used for identifying cells in the network. The method further includes determining whether to take one or more actions while transitioning from operating in an inactive mode to a connected mode, based in part on the identifier of the base station.

Certain aspects of the present disclosure provide an apparatus for wireless communication. The apparatus generally includes means for determining a cell identity, of a cell associated with a base station in a network. The apparatus also includes means for determining, from the cell identity, an identifier of the base station based on a partitioning of an identifier space used for identifying cells in the network. The apparatus further includes means for determining whether to take one or more actions while transitioning from operating in an inactive mode to a connected mode, based in part on the identifier of the base station.

Certain aspects of the present disclosure provide an apparatus for wireless communication. The apparatus generally includes at least one processor and a memory coupled to the at least one processor. The at least one processor is configured to determine a cell identity of a cell associated with a base station in a network. The at least one processor is also configured to determine, from the cell identity, an identifier of the base station based on a partitioning of an identifier space used for identifying cells in the network. The at least one processor is further configured to determine whether to take one or more actions while transitioning from operating in an inactive mode to a connected mode, based in part on the identifier of the base station.

Certain aspects of the present disclosure provide a computer-readable medium having computer executable code stored thereon for wireless communication by a UE. The computer executable code includes code for determining a cell identity of a cell associated with a base station in a network. The computer executable code also includes code for determining, from the cell identity, an identifier of the base station based on a partitioning of an identifier space used for identifying cells in the network. The computer executable code further includes code for determining whether to take one or more actions while transitioning from operating in an inactive mode to a connected mode, based in part on the identifier of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 illustrates an example of a message that includes a variable RAN node ID and/or cell ID, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
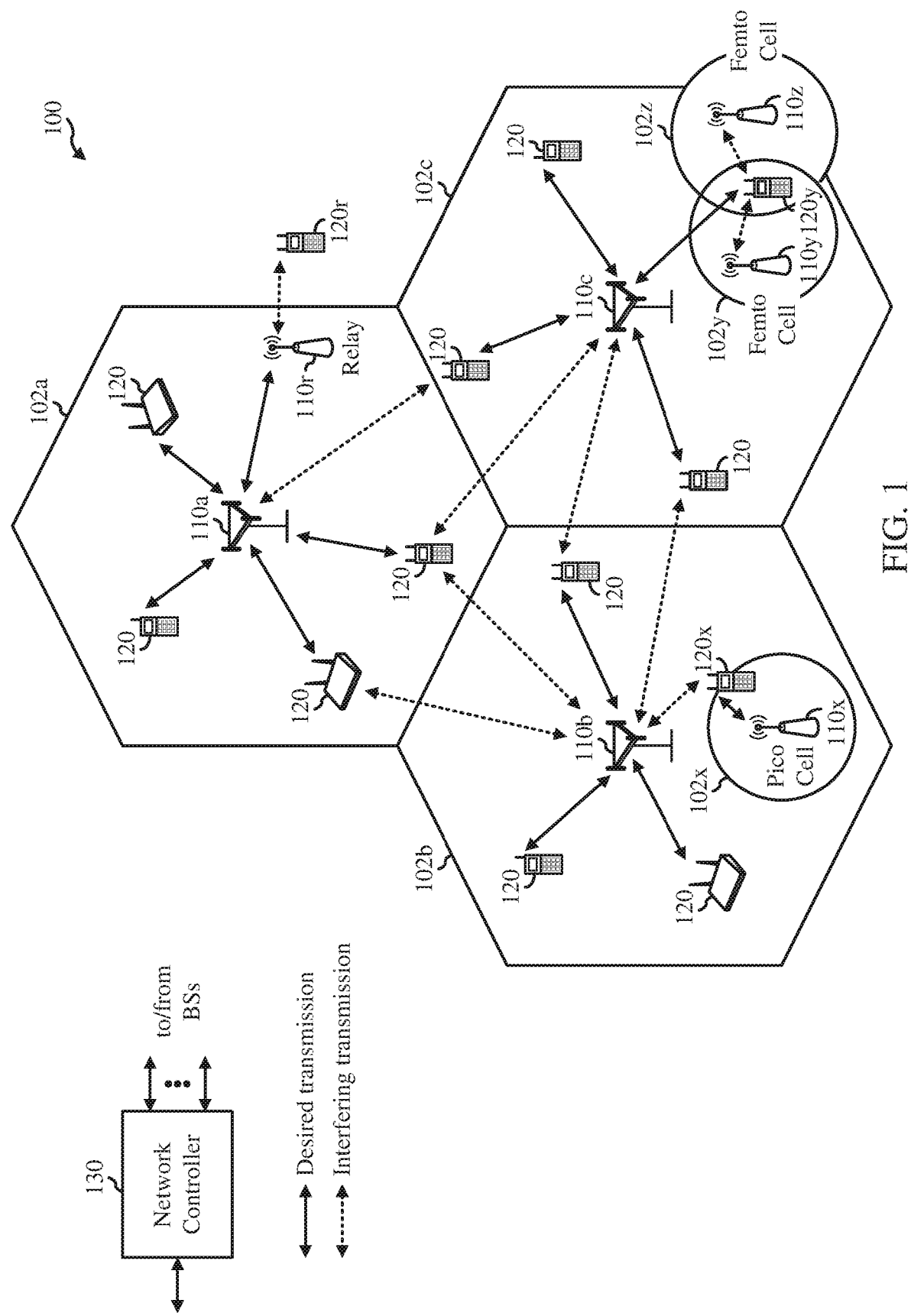
FIG. 1 is a block diagram conceptually illustrating an example telecommunications system, accordance with certain aspects of the present disclosure.

Aspects of the present disclosure provide apparatus, methods, systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In conventional systems (e.g., LTE), nodes typically have fixed length identifiers typically use identifiers that have a fixed length. As a reference example, the eNB identifier length in LTE is generally fixed to 20 bits (e.g., the first 20 bits of the cell identity). In some cases, fixing the eNB identifier length to 20 bits may allow for up to a million eNBs to be deployed in a network and each eNB may be able to support up to 256 cells. However, as the demand for networks to support both larger nodes (hosting more cells) as well as larger numbers of nodes continues to increase, certain deployments (e.g., with large number of nodes) may not be possible with fixed length node identifiers.

Accordingly, aspects of the present disclosure provide methods and apparatus for supporting variable and reconfigurable radio access network (RAN) node identifier lengths (e.g., for flexible deployment of cells) in a network.

In one aspect, a (first) base station (e.g., eNB, gNB, etc.) may determine a cell identity of a cell associated with another (second) base station in a network. The base station may determine, from the cell identity, an identifier of the second base station based on a partitioning of an identifier space used for identifying cells in the network. The base station may transmit a message that includes at least one of the identifier of the other base station or the cell identity associated with the other base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UNITS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed, for example, for enabling flexible deployment of cells in a network, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and evolved NB (eNB), Node B (NB), 5G NB, Next Generation NB (gNB), access point (AP), BS, NR BS, 5G BS, or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may communicate with a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block' (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, where a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

As noted above, a RAN may include a CU and DUs. A NR BS (e.g., eNB, 5G Node B, Node B, gNB, TRP, AP) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
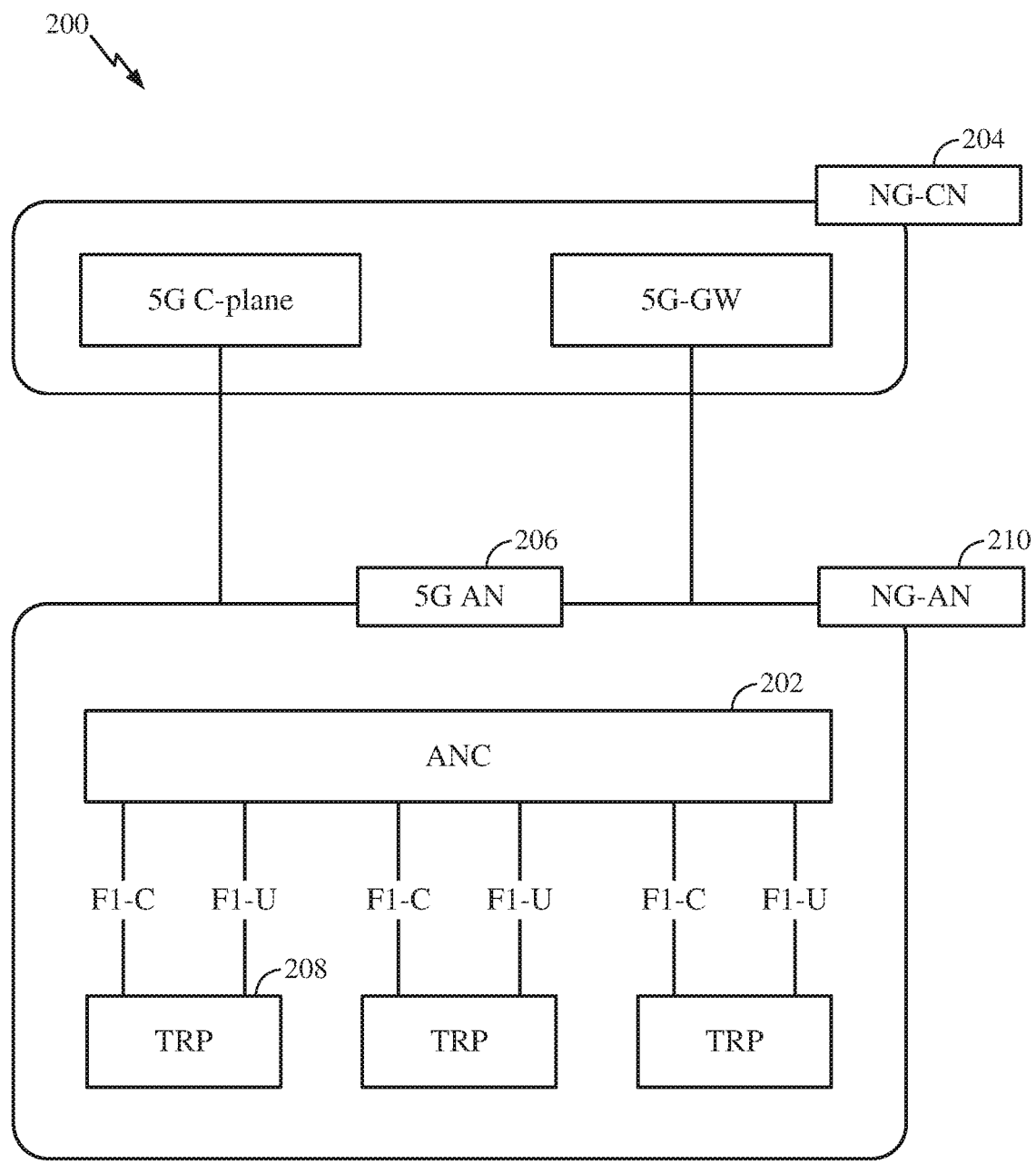
FIG. 2 is a block diagram illustrating an example logical architecture of a distributed RAN, in accordance with certain aspects of the present disclosure.

FIG. 2 illustrates an example logical architecture of a distributed RAN 200, which may be implemented in the wireless communication system illustrated in FIG. 1. A 56 access node 206 may include an access node controller (ANC) 202. The ANC may be a CU of the distributed RAN 200. The backhaul interface to the next generation core network (NG-CN) 204 may terminate at the ANC 202. The backhaul interface to neighboring next generation access nodes (NG-ANs) may terminate at the ANC 202. The ANC 202 may include one or more TRPs 208 (which may also be referred to as cells, BSs, NR BSs, gNB, Node Bs, 5G NBs, APs, or some other term).

The TRPs 208 may be a DU. The TRPs 208 may be connected to a single ANC (e.g., ANC 202) or more than one ANC (not illustrated). For example, for RAN sharing, radio as a service (RaaS), and service specific AND deployments, the TRPs 208 may be connected to more than one ANC. A TRP 208 may include one or more antenna ports. The TRPs 208 may be configured to individually (e.g., dynamic selection) or jointly (e.g., Joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The local architecture of the distributed RAN 200 may share features and/or components with LTE. NO-AN 210 may support dual connectivity with NR and may share a common fronthaul for LIE and NR. The logical architecture of the distributed RAN 200 may enable cooperation between and among TRPs 208, for example, within a TRP and/or across TRPs via the ANC 202. An inter-TRP interface may not be used.

Logical functions may be dynamically distributed in the logical architecture of the distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., the TRP 208) or CU (e.g., the ANC 202).

Figure 3:
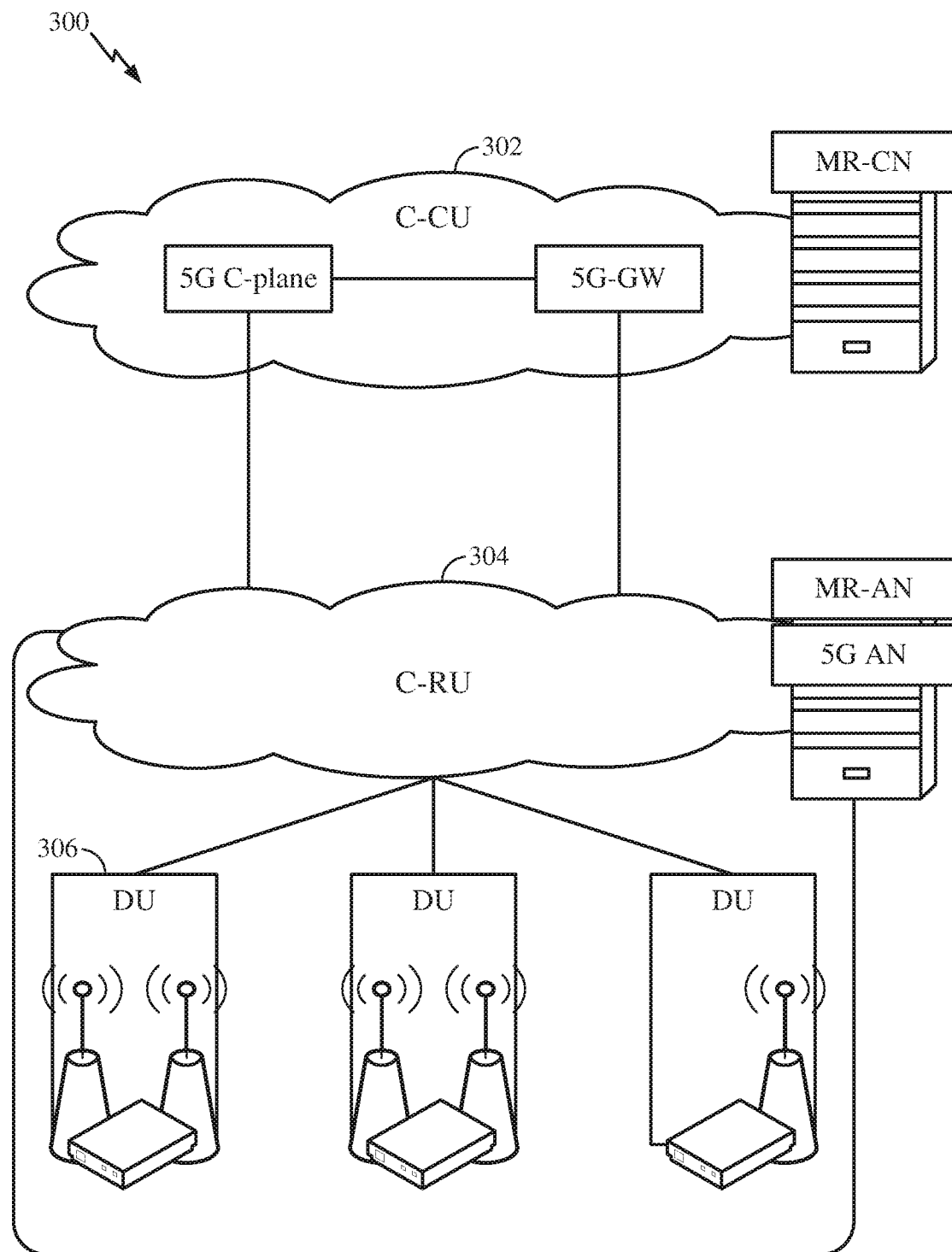
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. C-RU 304 may host core network functions locally. C-RU 304 may have distributed deployment. C-RU 304 may be closer to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
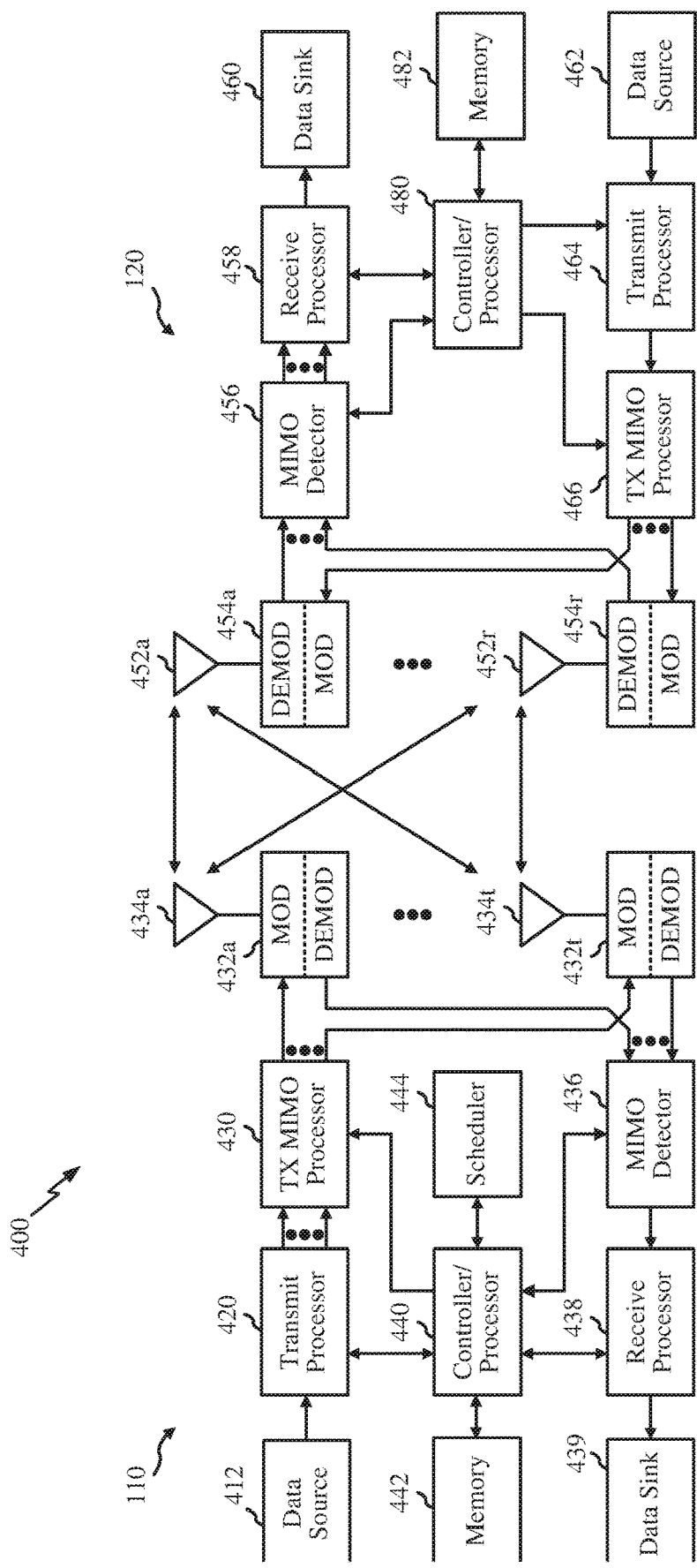
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10 and 12-14.

At BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared Channel (PDSCH), etc. For example, according to certain aspects of the present disclosure the BS 110 can send a slot format indicator (SFI), slot aggregation level information, and/or downlink control information (DCI) in a downlink control region. The processor 420 may process (e.g., encode and symbol map) the data and control information to obtain data symbols and control symbols, respectively. The processor 420 may also generate reference symbols, such as primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At UE 120, the antennas 452a through 452r may receive the downlink signals from BS 110 and may provide received signals to the demodulators (DEMODs) 454a through 454r, respectively. For example, according to certain aspects of the present disclosure the UE 120 can receive a slot format indicator (SFI), slot aggregation level information, and/or downlink control information (DCI) from the BS 110 in a downlink control region. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators 454a through 454r (e.g., for SC-FDM, etc.), and transmitted to BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at BS 110 and UE 120, respectively. The processor 440 and/or other processors and modules at the base station 110 may perform or direct, e.g., the execution of the functional blocks illustrated in FIG. 9, operations illustrated in FIGS. 12-13, and/or other processes for the techniques described herein. The processor 480 and/or other processors and modules at the UE 120 may perform or direct, e.g., the execution of the functional blocks illustrated in FIG. 14, operations illustrated in FIGS. 12-13, and/or other processes for the techniques described herein. The memories 442 and 482 may store data and program codes for BS 110 and UE 120, respectively. A scheduler 444 may schedule UEs for data transmission on the downlink and/or uplink.

Figure 5:
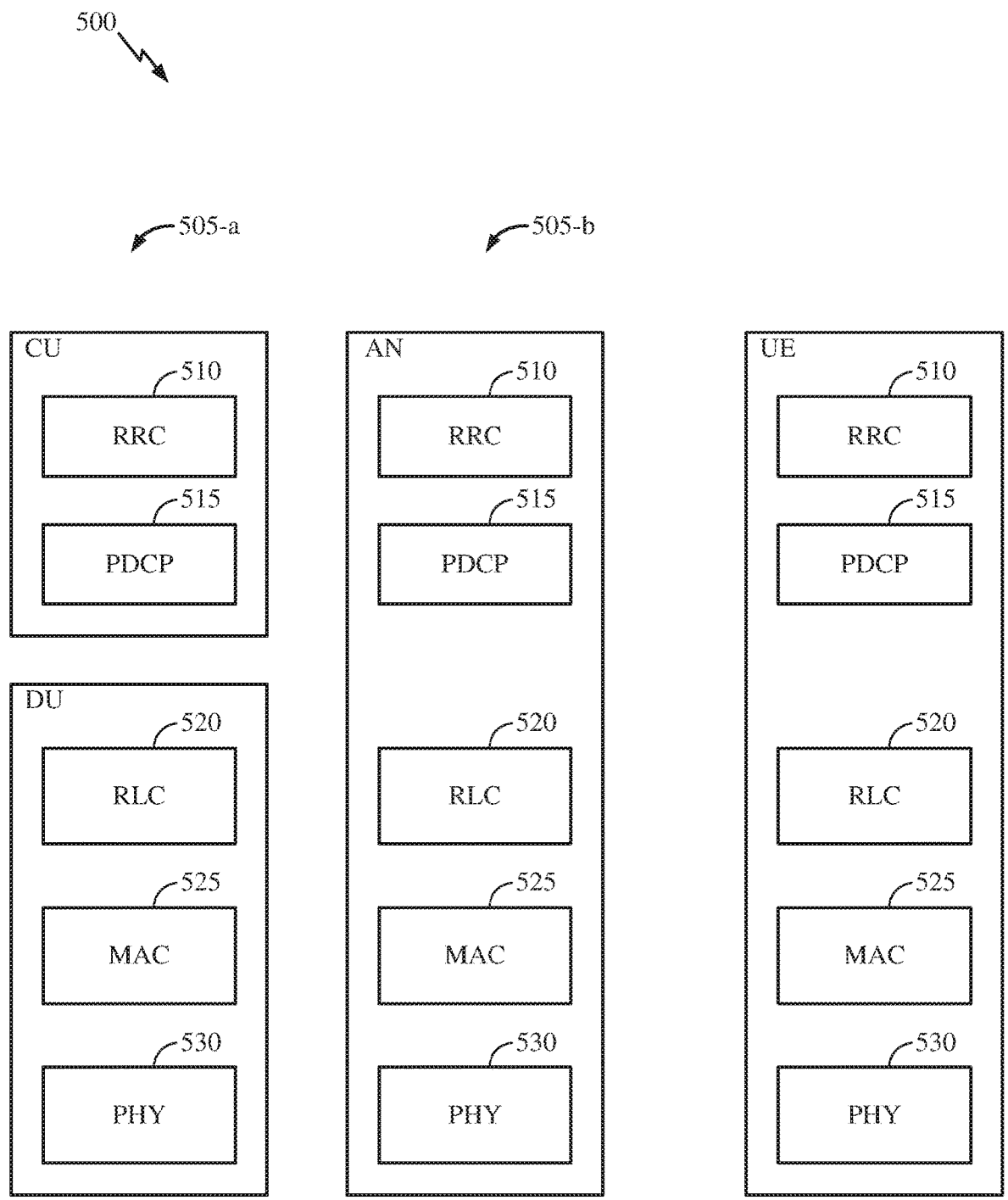
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. Layers of the protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
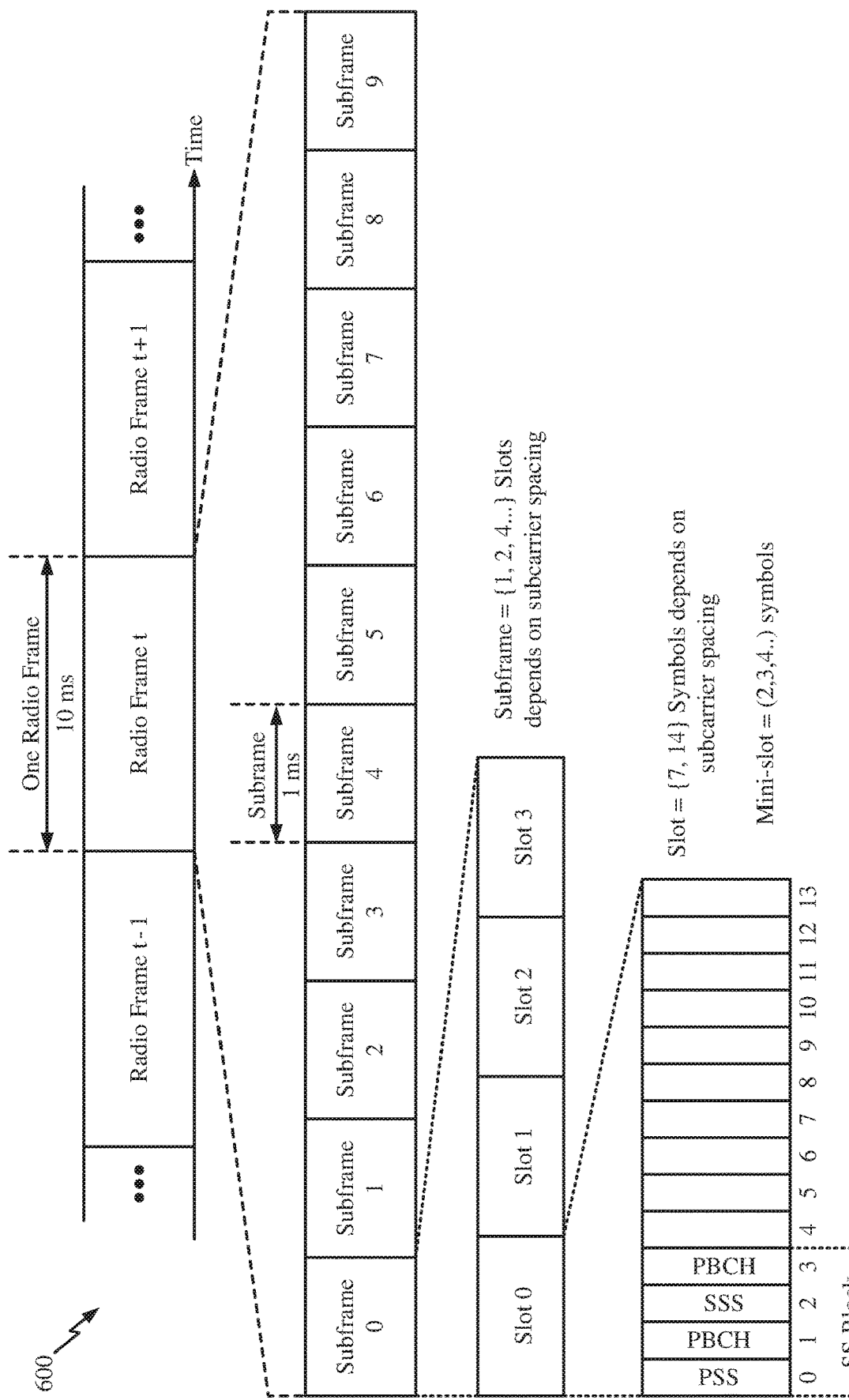
FIG. 6 illustrates an example frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 7:
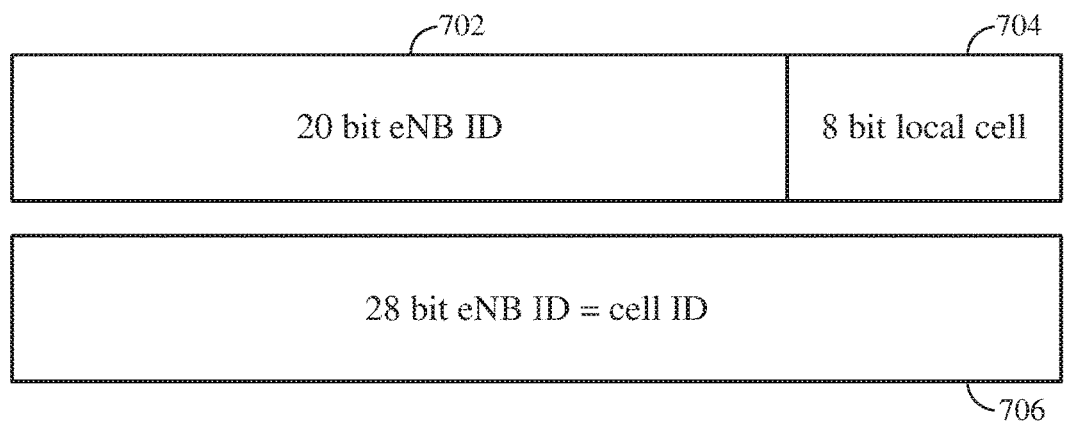
FIG. 7 illustrate examples of fixed RAN node IDs in a network, in accordance with certain aspects of the present disclosure.

As noted, in certain networks (e.g., LTE), RAN node (e.g., eNB) identifiers are generally defined with a single fixed length. For example, as shown in FIG. 7, in LTE, the length of the eNB identifier (ID) 702 is typically fixed to the first 20 bits (e.g., the 20 most significant bits) of the cell identity (ID). Fixing the eNB ID 702 length to 20 bits may allow for up to a million eNBs to be deployed in a network (e.g., public land mobility network (PLMN)) and each eNB may be able to support up to 256 cells. In another example, for Home eNBs (HeNBs), the HeNB ID length in LTE is equal to the full 28 bits of the cell ID 706 (e.g., as shown in FIG. 7). A 28 bit eNB ID length may allow for a larger deployment of eNBs (e.g., compared to a 20 bit eNB ID length), but each eNB may support one cell only. In other examples, an 18 bit eNB ID length and 21 bit eNB ID length may also be supported.

RAN node IDs may enable support for one or more different functions in a network. In one example, RAN node IDs may allow for mutual identification of nodes in an instance of an interface (e.g., eNB IDs across X2), and support the relationship between a RAN node ID and configuration data (e.g., cells hosted by the node, cell characteristics, etc.). In one example, RAN node IDs may allow for simple message routing within the RAN (e.g., which node, and therefore interface, to address for a particular interaction which may be at cell level). In this example, this function may not require the definition of a target RAN node ID (e.g., the target may be implicit in the choice of interface that carries the message). In one example, RAN node IDs may allow for message routing involving the core network (CN) and/or other entities (e.g., S1 handover). In this example, the target may be defined such that it can be interpreted by intermediate nodes.

Additionally, the ability to identify a RAN node (e.g., based on UE reports), and subsequently set up either direct interfacing towards that node (e.g., X2/Xn), or alternatively to route messages to that node via the CN (e.g., S1 HO), may be based on having a relationship between the cell ID and RAN Node ID (e.g., "most significant N bits"). Automatic neighbor relations (ANR) functionality, for example, may be based on this property.

In general, there has been increased demand for networks to support both larger RAN nodes (hosting more cells) as well as a larger number of RAN nodes. However, setting the RAN node ID to a fixed length (or limited set of fixed lengths) (e.g., as in current LTE networks) may limit the deployment options for a network. Accordingly, to allow for flexible deployment of RAN nodes and/or cells per RAN node, it may be desirable to support variable and reconfigurable RAN node ID lengths in a network.

Figure 8:
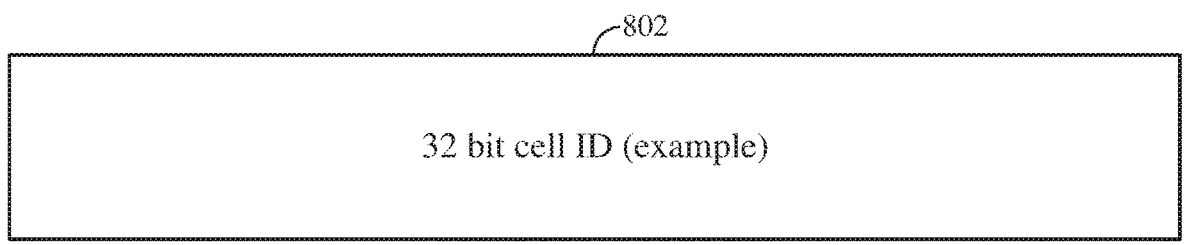
FIG. 8 illustrates an example of a cell ID that may support variable RAN node IDs in a network, in accordance with certain aspects of the present disclosure.

To maximize deployment flexibility, certain networks (e.g., NR or 5G networks) may enable a range of lengths of the RAN node identifier. Referring to one reference example in FIG. 8, assuming a 32 bit cell ID is employed in the network, the network may allow nodes to have variable RAN node ID lengths/sizes of the 32 bit cell ID. Note, however, that a 32 bit cell ID is used as merely a reference example, and that other (smaller or larger) sizes may be used for the cell ID.

In some aspects, each RAN node (e.g., eNB, gNB) may signal their node ID during setup of the interface towards the core (e.g., S1 or next generation (NG) in 5G). Each ID may have a length (e.g., subset of "N" bits of the cell ID) which is specific for that RAN node. The signaling may be defined using a variable length bit string. For example, the variable length bit string could be defined as "BIT STRING(SIZE (10 . . . 32))," meaning the RAN node ID could include any length between 10 and 32 bits, assuming a 32 bit size cell ID. In this example, a RAN node ID of 10 bits may enable up to approximately 1000 nodes with up to approximately 2 million cells each, and a RAN node ID of 32 bits may enable up to approximately 2 billion nodes of 1 cell each. Different combinations of maximum nodes and maximum cells per node may be enabled for ID sizes between 10 and 32 bits.

However, in networks that support variable RAN node ID lengths, RAN nodes (e.g., eNBs/gNBs), network entities (e.g., mobility management entity (MME), access and mobility function (AMF), etc.) and/or UEs may not be able to determine (e.g., derive) the RAN node ID from the detected cell ID. For example, referring back to FIG. 7, from the 28 bit cell II) (eNB ID 702+local cell 704), the eNB ID size can usually be inferred from the ID space (e.g., nodes may a priori know that the first 20 bits of the cell ID are equal to the eNB ID, or that 28 bits of the cell ID or equal to the eNB ID, etc.). Once the eNB ID is derived, it can be used in S1 messages as part of "Target ID," enabling routing between nodes (e.g., for handover via the CN, indirect communication via CN between the eNBs, etc.). However, if the RAN node ID for a given node can have any length, nodes may not be able to derive the RAN node ID from the detected cell ID, and thus, it may not be possible to route messages via the CN (as the target ID cannot be defined).

Aspects of the present disclosure provide techniques and apparatus for enabling support of variable RAN node ID sizes in a network (e.g., to support flexible deployment of cells and/or nodes in a network). More specifically, aspects presented herein provide techniques and apparatus for determining a RAN node ID from a cell ID of a cell associated with the RAN node. Note that, for the sake of clarity, the term eNB ID may be used to refer to eNB ID, gNB ID, or any other RAN node ID.

Figure 9:
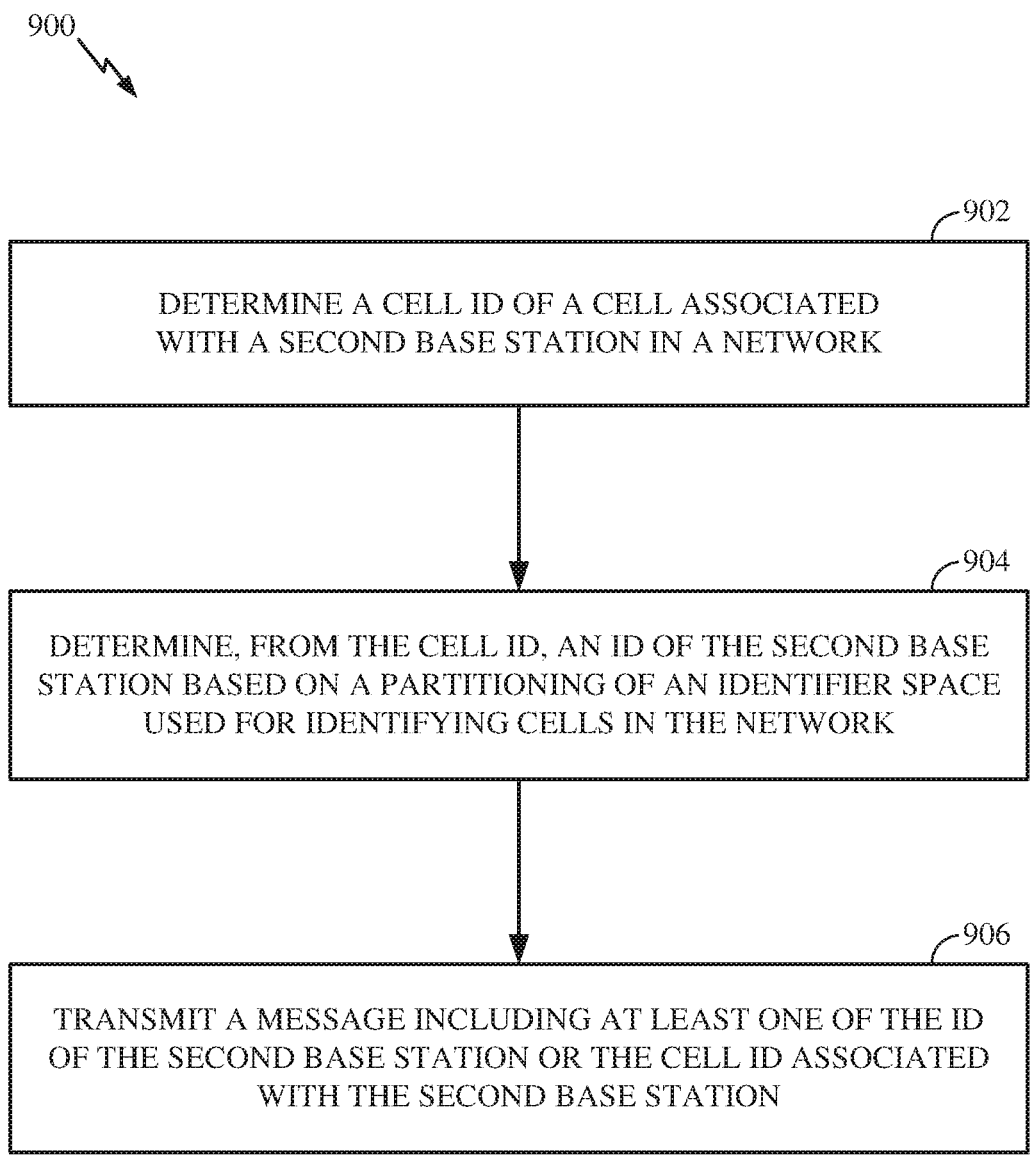
FIG. 9 illustrates example operations for wireless communications by a base station, in accordance with certain aspects of the present disclosure.

FIG. 9 illustrates example operations 900 for wireless communications, in accordance with certain aspects of the present disclosure. The operations 900 may be performed by a first BS (e.g., BS 110, such as an eNB, gNB, etc.).

The operations 900 may begin at 902, where the first BS determines a cell ID of a cell associated with a second BS in a network. The second BS, for example, may be a target BS of a handover of a UE from the first BS. A UE served by the first BS may have detected the cell ID and reported the cell ID to the first. BS (e.g., as in ANR). At 904, the first BS determines, from the cell ID, an ID of the second BS based on a partitioning of an identifier space used for identifying cells in the network. At 906, the first BS transmits a message that includes at least one of the ID of the second BS or the cell ID associated with the second BS.

Figure 10:
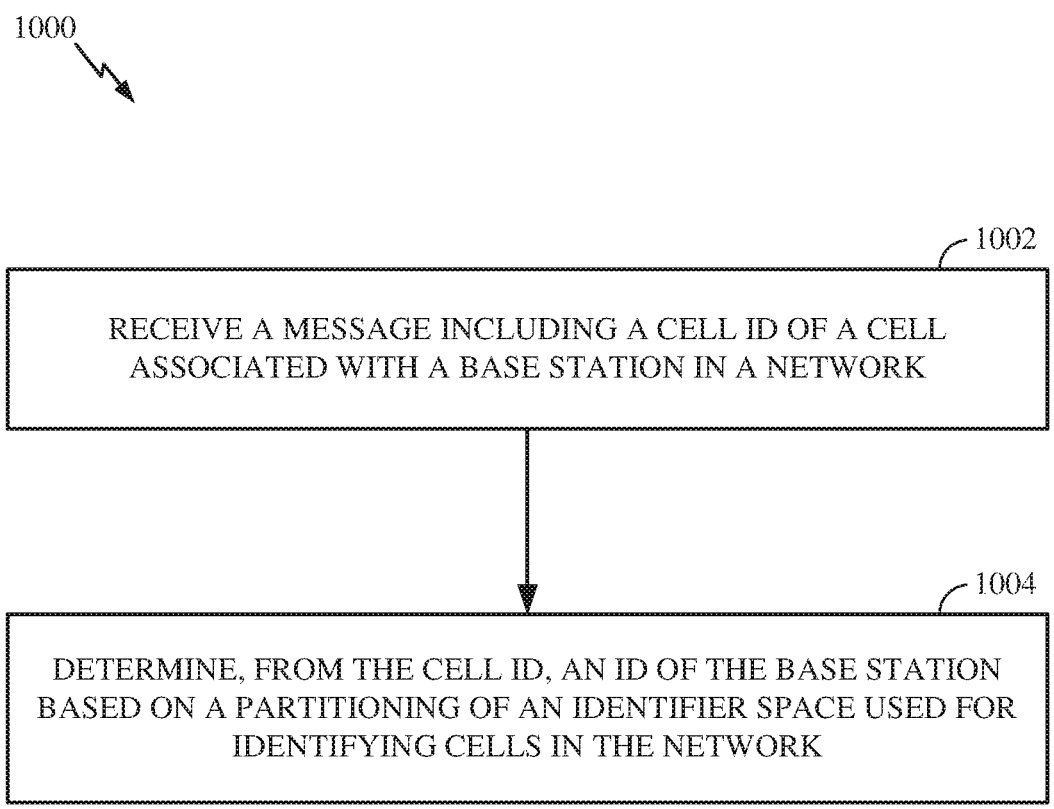
FIG. 10 illustrates example operations for wireless communications by a network entity, in accordance with certain aspects of the present disclosure.

FIG. 10 illustrates example operations 1000 for wireless communications, in accordance with certain aspects of the present disclosure. The operations 1000 may be performed by a network entity (e.g., a core network entity, such as a MME or AMF).

The operations 1000 may begin at 1002, where the network entity receives a message that includes a cell ID of a cell associated with a BS (e.g., second/target BS). In one aspect, the message may be received from the first (e.g., source) BS to trigger a CN based handover of a UE from the first BS to a second (e.g., target) BS. In one aspect, the message may be received as part of a configuration information transfer from the first BS to a second BS. At 1004, the network entity determines, from the cell ID, an ID of the (second/target) BS based on a partitioning of an identifier space used for identifying cells in the network.

In some aspects, there may be an explicit signaling of the RAN node ID length. For example, the length of the RAN node ID could be broadcast in SIB (or the ID itself could be broadcast). The detected RAN node ID length (of the second BS) may be reported by the UE to the first BS, and the first BS can use the RAN node ID length to derive the RAN node ID from the cell ID.

Alternatively, in some aspects, (e.g., at operations 904/ 1004/1404 in FIGS. 9, 10 and 14, respectively) the RAN node ID length may be determined based on a partitioning of the cell ID space. For example, the cell ID space may be divided up in a deployment, such that the RAN node ID length can be inferred from a subset of the cell ID. In one aspect, the partitioning may be determined based on one or more first bits of the cell ID. For example, assuming a 32 bit cell ID, the first 10 most significant bits (or another amount of bits) may be used for partitioning the cell ID space. A node (e.g., first BS, UE, network entity) may determine a second one or more bits of the cell ID used for at least a portion of the RAN node ID (e.g., the length of the RAN node ID), based on the first one or more bits. For example, the first 10 most significant hits can be used to signal the length of the RAN node ID. In one reference example, if the value of the first 10 bits is between 0 and 500, the RAN node ID length may be 20 bits, if the value of the first 10 bits is between 501 and 900, the RAN node ID length may be 28 bits, and so on.

Once the node (e.g., gNB, UE, network entity) determines the length of the RAN node ID, the node may compare the second one or more bits of the cell ID to corresponding bits of each of a plurality of RAN node IDs, and select one of the RAN node IDs as the RAN node ID based on the comparison. In some cases, the node may determine, based on the comparison, that the second one or more bits of the cell ID match corresponding bits of a single RAN node ID from the plurality of RAN node IDs, and set the ID of the RAN node equal to the single RAN node ID.

For example, the RAN node IDs may be defined so as not to be fully contained in another RAN node ID. Assuming a 20 bit RAN node ID is defined, then all RAN node IDs of length 20 bits may be different (e.g., for legacy networks), all RAN node IDs of length greater than 20 bits may not have the same settings in the first 20 bits, and all RAN node IDs of length L (where L<20) may be such that the first L bits of the 20 bit RAN node ID may not have the same values as any of these. With the above restriction, given a cell ID and the complete list of RAN node IDs, the RAN node controlling the cell is the one where all its hits match the corresponding bits in the cell ID.

In some cases, the node may determine, from the comparison, that the second one or more bits of the cell ID match corresponding bits of multiple RAN node IDs from the plurality of RAN node IDs. In such a case, the node may determine a RAN node ID from the RAN node IDs that has a greatest number of matching bits to bits of the cell ID, and set the ID of the RAN node (e.g., second BS) equal to the determined RAN node ID.

For example, the RAN node IDs may be defined such that one or more of the RAN node Ms have common prefixes. In this case, the RAN node M (signaled by the node) may correspond to a common prefix of the RAN node IDs hosted by the node, subject to the condition that the configured cell IDs are unique and that, for any two nodes, the RAN node ID lengths and values are different. With the above restriction, the RAN node controlling the cell is the one with the longest prefix match (e.g., between bits of the RAN node ID and cell ID).

Once the node (e.g., first BS) determines the RAN node ID of the RAN node (e.g., second BS), the node can use the RAN node ID to route messages, e.g., as part of a configuration information transfers, CN-based handovers, etc. As shown in FIG. 11, the node may generate a message with a "Target ID Information Element" 1102. The Target ID Information Element 1102 may include at least one of a Target RAN node ID field 1104 or a cell ID field 1106. The Target RAN node ID field 1104 may include the RAN Node ID 1108 and selected tracking area identity (TAI) 1110. The cell ID field 1106 may include the cell ID 1112 and the selected TAI 1114. The selected TAI 1110 may be same or different as selected TAI 1114. The Target ID information element 1102 may be included in S1-type messages, such as "Handover Required," "eNB Configuration Transfer," and "MME Configuration Transfer."

For messages that include the RAN node ID (e.g., RAN Node ID 1104), a legacy routing procedure may be used to route the message via the RAN and/or CN. For messages that include the cell ID (e.g., Cell ID 1106), the CN may move the message to the CN node that controls the tracking area (e.g., TAI), The CN node may find the full match between N-bit RAN node ID 1108 and first N bits of cell ID 1112, and (1) if there is a single match, select that RAN node ID, or (2) if there is more than one match, select the RAN node ID for which N is the largest (e.g., based on a longest prefix match algorithm).

Figure 12:
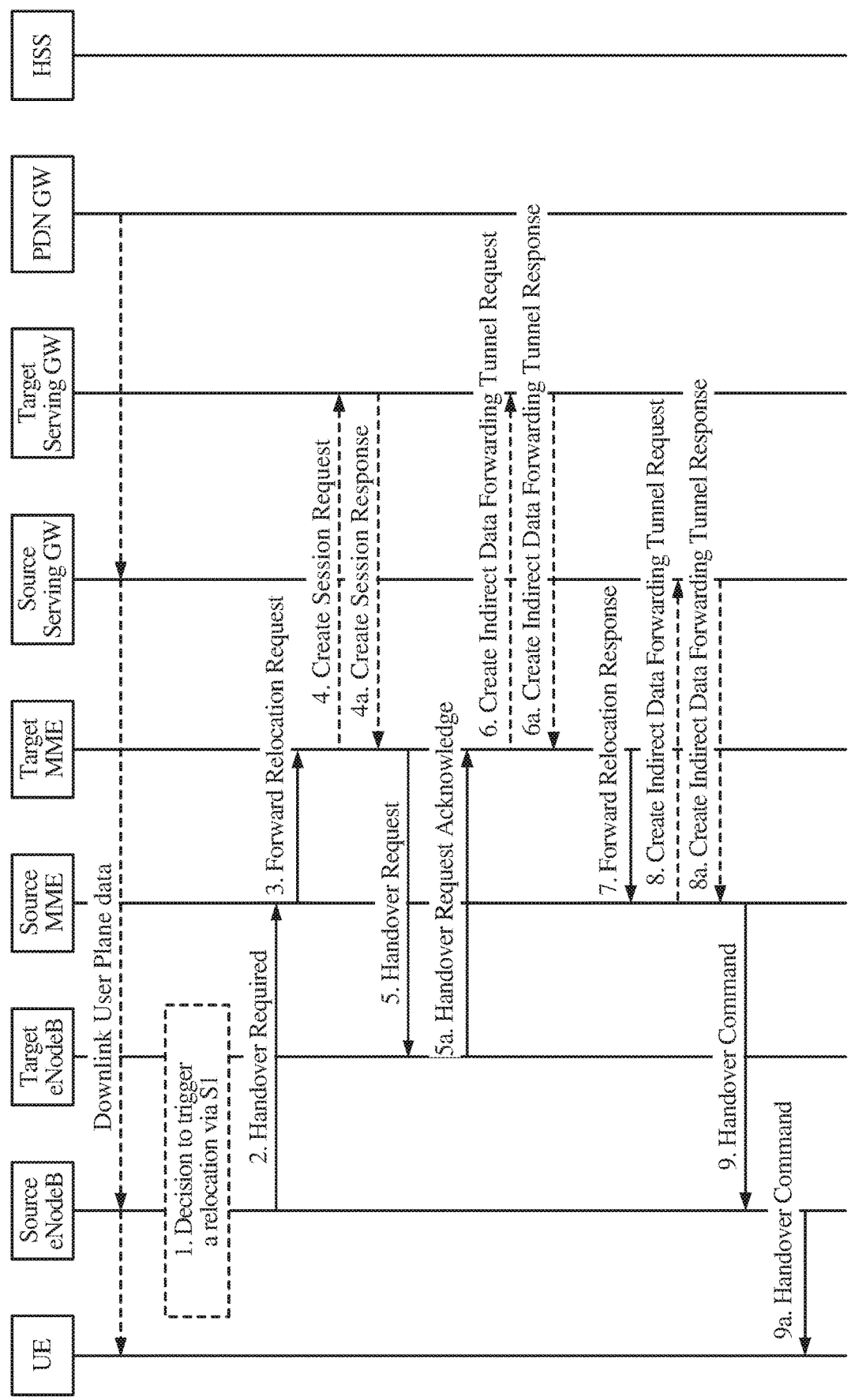
FIG. 12 illustrates an example call flow for a CN-based handover that uses variable RAN node IDs, in accordance with certain aspects of the present disclosure.

FIG. 12 illustrates an example call flow for a CN based handover to a non-configured neighbor cell that uses a variable RAN node identifier, according to certain aspects of the present disclosure. Note that while FIG. 12 depicts a CN based handover for a LTE network, the techniques may also be applied to a 5G network. For example, the eNB, MME, and SGW entities (for a LTE network) in FIG. 12 may be interchangeable with gNB, AMP, and UPF (for a 5G network).

As shown, in step 1, the source eNB may determine to trigger a relocation via S1. In step 2, the source eNB sends "Handover Required" with target ID based on cell ID to the source MME. In some cases, if the source eNB is not able to determine the target ID, the source eNB can send the cell ID to the source MME. The source MME can use the TAI to identify the target MME in step 3 (if needed), and send a "Forward Relocation Request" including new type of Target ID (e.g., with cell ID). In step 5, the target MME can use prefix match with the received cell ID to select the target eNB, and if there is more than one possible target, the target MME can select the longest prefix as the target eNB ID. In step 9, the source MME can provide the target to the source eNB.

In some aspects, the variable RAN node IDs may also be used as part of a configuration information exchange. For example, a first BS may send a message to the CN with cell ID and configuration information. The CN may use the cell ID to identify a second BS, and send the message to the second BS. The second BS may receive the information, and send a message to the CN with its own configuration information including its ID (and the ID of the first BS). The CN may forward the message to the first BS, which receives the ID of the second BS and configuration information.

Figure 13:
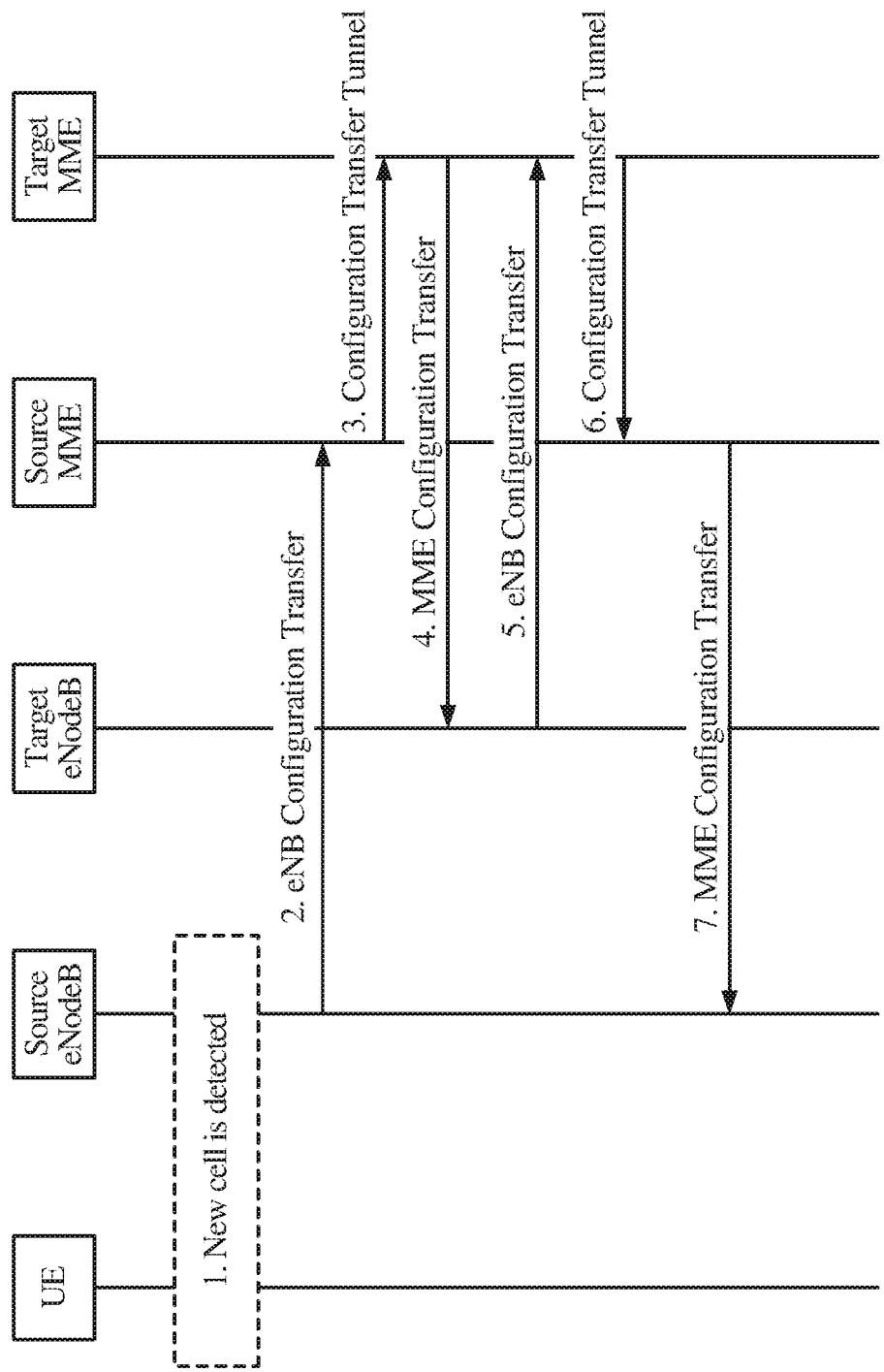
FIG. 13 illustrates an example call flow for a configuration information exchange using variable RAN node IDs, in accordance with certain aspects of the present disclosure.

FIG. 13 illustrates an example call flow for a configuration information exchange (e.g., for new cell/eNB IP address discovery for X2 setup) using variable RAN node identifiers, according to certain aspects of the present disclosure.

Note that while FIG. 13 depicts a configuration exchange for LTE, the techniques may also be applied to a 5G network. For example, the eNB, MME, and SGW entities (for a LTE network) in FIG. 13 may be interchangeable with gNB, AMF, and UPF (for a 5G network).

As shown, in step 1, a new cell is detected by the UE and reported to the source eNB. In step 2, the source eNB sends eNB Configuration Transfer with target ID based on cell ID. In step 3, the source MME forwards the configuration transfer based on TAI, and includes the cell ID information. In step 4, the target MME uses prefix match, and if there is more than one match, selects longest matching prefix as the target eNB ID. In step 5, the target eNB sends a message to the target MME with its own configuration information (including its ID and the source ID). In step 6, the target MME forwards the information to the source MME, and in step 7, the source MME forwards the information to the source eNB.

In some aspects, the variable RAN node IDs may also be used by UEs operating in an inactive mode.

There are various IoT applications that involve an exchange of relatively small amounts of data. For example, metering and alarm applications typically involve a small amount of mobile originated (MO) data, while various queries, notifications of updates, enabling actuators, and the like involve a small amount of mobile terminated (MT) data. Unfortunately, establishing a connection between a mobile device and network involves a large overhead (relative to the small amount of data). In some cases, a UE may be placed in an inactive "RAN controlled" state that represents a middle ground between a connected state and an idle state. For example, a UE in an inactive "RAN controlled" connected state (e.g., RRC_INACTIVE state) may have various characteristics, such as:

Cell re-selection mobility;
CN—NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to; and
The UE may have no dedicated resources.

Allowing data transmission to/from a mobile device (e.g., a UE) that is in RRC_INACTIVE state makes sense if UE has small amount of data to transmit and RAN has no or small amount of data to transmit in the state. If either the UE or RAN has subsequent data to transmit, the overhead to move to an active connected state (e.g., RRC_CONNECTED mode) may be justified, so that the data can be sent with dedicated resources.

In one scenario, UL data transmissions may be supported without RRC signaling without initiating transition to active (this may be referred to as option A). An alternative scenario is to support UL data transmission with RRC signaling, but without initiating transition to active (dais may be referred to as option B).

While operating in inactive mode, there may be several functions where the UE may benefit from identifying cells belonging to the same RAN node. In one example, staying on such cells during UE controlled mobility in idle/inactive mode may allow for faster resumption of connected mode when transitioning from inactive state as no context fetch is need. In some cases, staying on the cell may also allow for faster paging of MT traffic in idle/inactive mode. In one example, using a short ID that is unique in the cells controlled by the RAN node may be beneficial when making a request to transition from the inactive to connected state.

In some aspects, the UE may use a similar algorithm as described above to determine the RAN node ID from the cell ID. For example, the UE may perform a maximum prefix match between its current cell (or last cell in connected mode) and detected cells in idle mode. The cells with a higher prefix match may be given higher priority during the idle/inactive reselection process.

Figure 14:
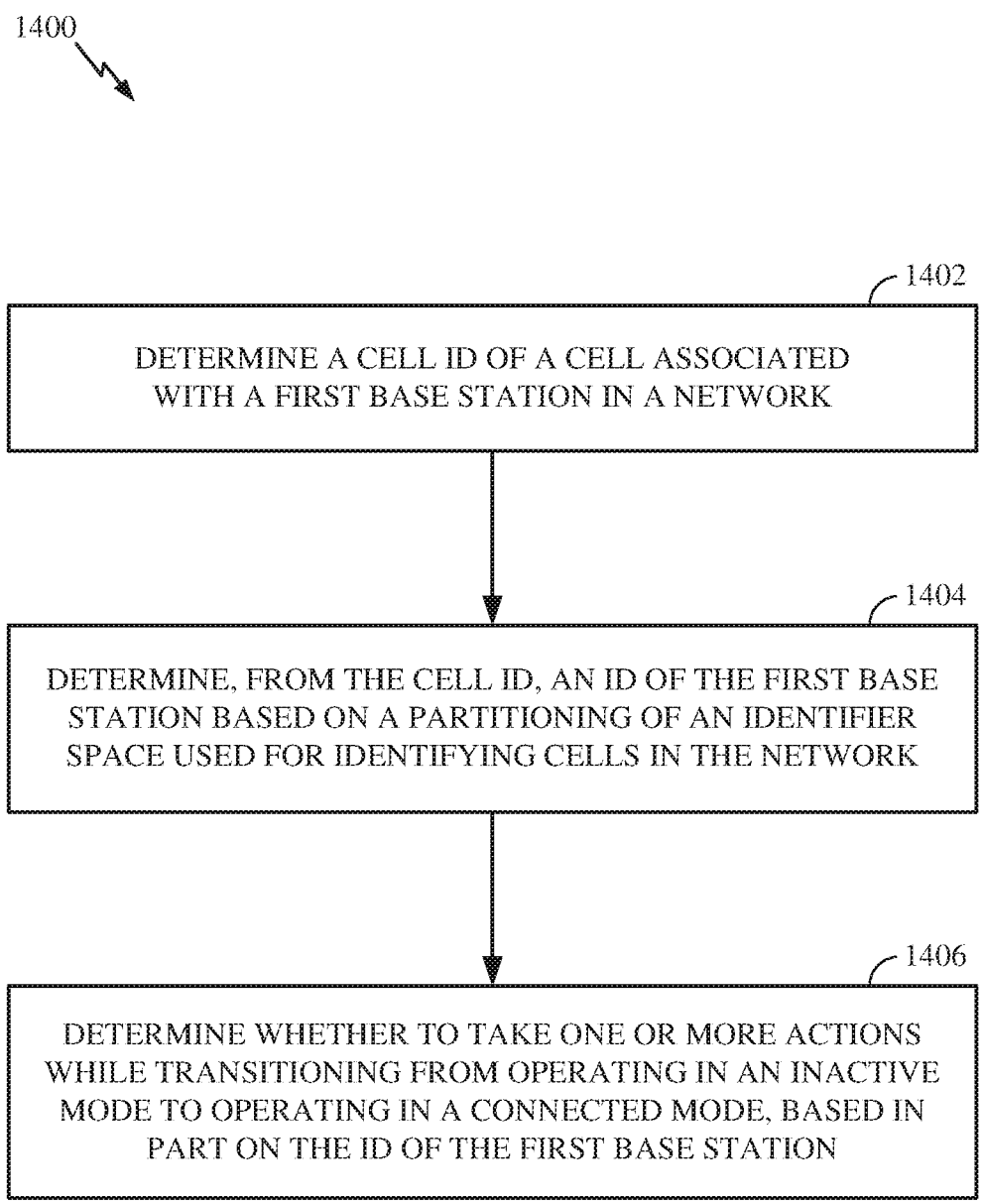
FIG. 14 illustrates example operations for wireless communications by a user equipment, in accordance with certain aspects of the present disclosure.

FIG. 14 illustrates example operations 1400 for wireless communications, in accordance with certain aspects of the present disclosure. The operations 1400 may be performed by a UE (e.g., UE 120).

The operations 1400 may begin at 1402, wherein the UE determines a cell ID of a cell associated with a first BS in a network. At 1404, the UE determines, from the cell ID, an ID of the first BS based on a partitioning of an identifier space used for identifying cells in the network. At 1406, the UE determines whether to take one or more actions while transitioning from operating in an inactive mode to operating in a connected mode, based in part on the ID of the first BS.

In some aspects, the one or more actions may include at least one of a context switch or security key change procedure. The UE may determine to perform at least one of a context switch or security key change procedure if the ID of the first BS is different than a second BS the UE was previously connected to prior to transitioning from operating in the inactive mode.

Figure 15:
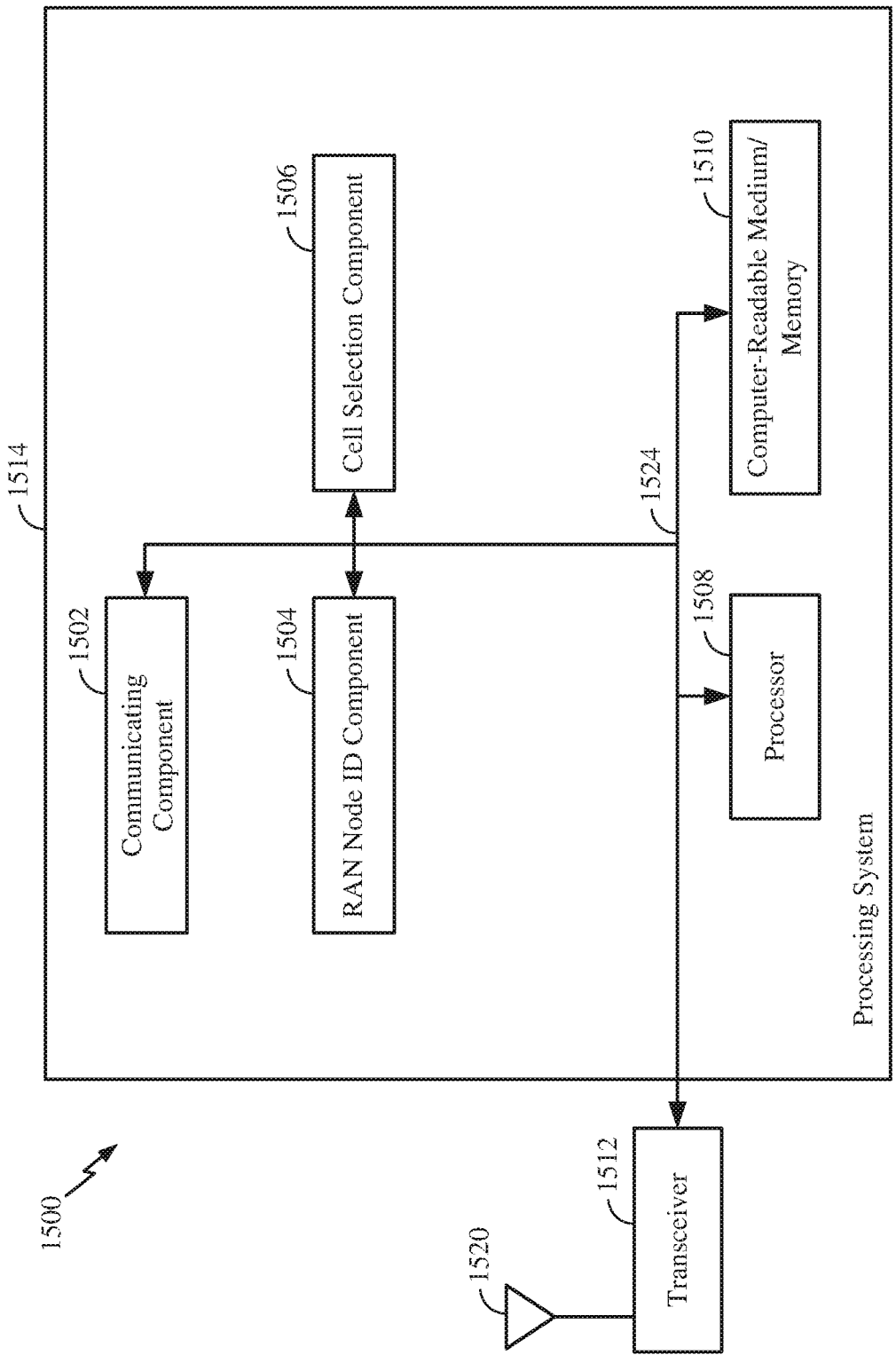
FIG. 15 illustrates a communications device that may include various components configured to perform operations for the techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIGS. 9-10 and 12-14. The communications device 1500 includes a processing system 1514 coupled to a transceiver 1512. The transceiver 1512 is configured to transmit and receive signals for the communications device 1500 via an antenna 1520, such as the various signals described herein. The processing system 1514 may be configured to perform processing functions for the communications device 1500, including processing signals received and/or to be transmitted by the communications device 1500.

The processing system 1514 includes a processor 1508 coupled to a computer-readable medium/memory 1510 via a bus 1524. In certain aspects, the computer-readable medium/memory 1510 is configured to store instructions that when executed by processor 1508, cause the processor 1508 to perform the operations illustrated in FIGS. 9-10 and 12-14, and/or other operations for performing the various techniques discussed herein.

In certain aspects, the processing system 1514 further includes a communicating component 1502 for performing the operations illustrated at 906 in FIG. 9, operations illustrated at 1002 in FIG. 10, and/or operations illustrated in FIGS. 12-13. Additionally, the processing system 1514 includes a RAN node ID component 1504 for performing the operations illustrated at 902 and 904 in FIG. 9, operations illustrated at 1004 in FIG. 10, and/or operations illustrated at 1402, 1404 and 1406 in FIG. 14. The communicating component 1502 and RAN node ID component 1504 may be coupled to the processor 1508 via bus 1524. In certain aspects, the communicating component 1502 and RAN node ID component 1504 may be hardware circuits. In certain aspects, the communicating component 1502 and RAN node ID component 1504 may be software components that are executed and run on processor 1508.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, h, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for signaling, means for indicating, means for routing, means for forwarding, means for communicating, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for identifying, means for determining, means for generating, means for partitioning, means for adding, means for comparing, means for selecting, means for setting, means for initiating, means for handing over, means for triggering, means for routing, means for forwarding, means for performing and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, the instructions may include instructions for performing the operations described herein and illustrated in FIGS. 9-10 and 12-14.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first base station, comprising:
   determining a cell identity of a cell associated with a second base station in a network;
   determining, from the cell identity, an identifier of the second base station based on a partitioning of an identifier space used for identifying cells in the network, wherein the partitioning of the identifier space is based on a first one or more bits of the cell identity, and wherein determining the identifier of the second base station comprises:
      determining a second one or more bits of the cell identity used for at least a portion of the identifier of the second base station, based on the partitioning;
      comparing the second one or more bits of the cell identity to corresponding bits of each of a plurality of base station identifiers; and
      selecting one of the plurality of base station identifiers as the identifier of the second base station based on the comparison; and
   transmitting a message comprising at least one of the identifier of the second base station or the cell identity associated with the second base station.

2. The method of claim 1, wherein the first one or more bits comprise one or more most significant bits of the cell identity.

3. The method of claim 1, wherein selecting one of the plurality of base station identifiers as the identifier of the second base station comprises:
   determining, from the comparison, that the second one or more bits of the cell identity match corresponding bits of a single base station identifier from the plurality of base station identifiers; and
   setting the identifier of the second base station equal to the single base station identifier.

4. The method of claim 1, wherein selecting one of the plurality of base station identifiers as the identifier of the second base station comprises:
   determining, from the comparison, that the second one or more bits of the cell identity match corresponding bits of multiple base station identifiers from the plurality of base station identifiers;
   determining a base station identifier from the multiple base station identifiers that has a greatest number of matching bits to bits of the cell identity; and
   setting the identifier of the second base station equal to the determined base station identifier.

5. The method of claim 1, wherein the message is transmitted to initiate a handover of an user equipment (UE) from the first base station to the second base station.

6. The method of claim 5, wherein the message is transmitted to a core network entity.

7. The method of claim 6, further comprising:
   after transmitting the message, receiving another message from the core network entity comprising the identifier of the second base station.

8. The method of claim 1, wherein:
   the message further comprises configuration information; and
   the message is transmitted to a core network entity.

9. The method of claim 8, wherein the message is routed, via the core network entity, to the second base station.

10. The method of claim 9, further comprising:
    after transmitting the message, receiving another message from the core network entity, wherein the other message comprises configuration information and the identity of the second base station.

11. A method for wireless communications by a network entity, comprising:
    receiving a message comprising a cell identity of a cell associated with a target base station in a network; and
    determining, from the cell identity, an identifier of the target base station based on a partitioning of an identifier space used for identifying cells in the network, wherein the partitioning of the identifier space is based on a first one or more bits of the cell identity, and wherein determining the identifier of the target base station comprises:
       determining a second one or more bits of the cell identity used for at least a portion of the identifier of the target base station, based on the partitioning;
       comparing the second one or more bits of the cell identity to corresponding bits of each of a plurality of base station identifiers; and
       selecting one of the plurality of base station identifiers as the identifier of the target base station based on the comparison.

12. The method of claim 11, wherein the first one or more bits comprise one or more most significant bits of the cell identity.

13. The method of claim 11, wherein selecting one of the plurality of base station identifiers as the identifier of the target base station comprises:
    determining, from the comparison, that the second one or more bits of the cell identity match corresponding bits of a single base station identifier from the plurality of base station identifiers; and
    setting the identifier of the target base station equal to the single base station identifier.

14. The method of claim 11, wherein selecting one of the plurality of base station identifiers as the identifier of the target base station comprises:

determining, from the comparison, that the second one or more bits of the cell identity match corresponding bits of multiple base station identifiers from the plurality of base station identifiers;

determining a base station identifier from the multiple base station identifiers that has a greatest number of matching bits to bits of the cell identity; and setting the identifier of the target base station equal to the determined base station identifier.

15. The method of claim 11, wherein:
the message is received from a source base station or another network entity; and
the message initiates a handover of a user equipment from the source base station to the target base station.

16. The method of claim 15, further comprising transmitting a handover request to the target base station after determining the identifier of the target base station.

17. The method of claim 11, wherein:
the message is received from a source base station; and
the message comprises configuration information.

18. The method of claim 17, further comprising transmitting the message to the target base station after determining the identifier of the target base station.

19. The method of claim 18, further comprising:
receiving another message from the target base station, the other message comprising configuration information, the identifier of the target base station and an identifier of the source base station; and
transmitting the other message to the source base station.

20. The method of claim 11, wherein the network entity is a mobile management entity (MME) or an access and mobility function (AMF).

21. An apparatus for wireless communications, comprising:
means for determining a cell identity of a cell associated with a second base station in a network;
means for determining, from the cell identity, an identifier of the second base station based on a partitioning of an identifier space used for identifying cells in the network, wherein the partitioning of the identifier space is based on a first one or more bits of the cell identity, and wherein the means for determining the identifier of the second base station comprises:
means for determining a second one or more bits of the cell identity used for at least a portion of the identifier of the second base station, based on the partitioning;
means for comparing the second one or more bits of the cell identity to corresponding bits of each of a plurality of base station identifiers; and
means for selecting one of the plurality of base station identifiers as the identifier of the second base station based on the comparison; and
means for transmitting a message comprising at least one of the identifier of the second base station or the cell identity associated with the second base station.

22. The apparatus of claim 21, wherein the first one or more bits comprise one or more most significant bits of the cell identity.

23. An apparatus for wireless communications, comprising:
means for receiving a message comprising a cell identity of a cell associated with a target base station in a network; and
means for determining, from the cell identity, an identifier of the target base station based on a partitioning of an identifier space used for identifying cells in the network, wherein the partitioning of the identifier space is based on a first one or more bits of the cell identity, and wherein the means for determining the identifier of the target base station comprises:
means for determining a second one or more bits of the cell identity used for at least a portion of the identifier of the target base station, based on the partitioning;
means for comparing the second one or more bits of the cell identity to corresponding bits of each of a plurality of base station identifiers; and
means for selecting one of the plurality of base station identifiers as the identifier of the target base station based on the comparison.

24. The apparatus of claim 23, wherein the first one or more bits comprise one or more most significant bits of the cell identity.

* * * * *